United States Patent
Visagie et al.

(10) Patent No.: US 8,067,333 B2
(45) Date of Patent: *Nov. 29, 2011

(54) CATALYSTS

(75) Inventors: Jacobus Lucus Visagie, Sasolburg (ZA); Jan Mattheus Botha, Sasolburg (ZA); Johannes Gerhardus Koortzen, Sasolburg (ZA); Michael Steven Datt, Johannesburg (ZA); Alta Bohmer, Deneysville (ZA); Jan Van De Loosdrecht, Sasolburg (ZA); Abdool Muthalib Saib, Vanderbijlpark (ZA)

(73) Assignee: Sasol Technology (Proprietary) Limited (ZA)

( * ) Notice: Subject to any disclaimer, the term of this patent is extended or adjusted under 35 U.S.C. 154(b) by 123 days.

This patent is subject to a terminal disclaimer.

(21) Appl. No.: 12/598,742

(22) PCT Filed: May 5, 2008

(86) PCT No.: PCT/IB2008/051724
§ 371 (c)(1),
(2), (4) Date: Nov. 3, 2009

(87) PCT Pub. No.: WO2008/135940
PCT Pub. Date: Nov. 13, 2008

(65) Prior Publication Data
US 2010/0144520 A1    Jun. 10, 2010

(30) Foreign Application Priority Data
May 4, 2007   (ZA) ................................ 2007/03621

(51) Int. Cl.
*B01J 23/00* (2006.01)
*B01J 21/00* (2006.01)
*B01J 20/00* (2006.01)

(52) U.S. Cl. ........ 502/326; 502/104; 502/260; 502/327; 502/439

(58) Field of Classification Search ................ 502/104, 502/260, 326, 327, 439
See application file for complete search history.

(56) References Cited

U.S. PATENT DOCUMENTS

| 4,605,679 A | 8/1986 | Kobylinski et al. |
| 5,292,705 A | 3/1994 | Mitchell |
| 5,585,316 A | 12/1996 | Nay et al. |
| 5,733,839 A | 3/1998 | Espinoza et al. |
| 6,455,462 B2 | 9/2002 | Van Berge et al. |
| 2003/0125201 A1 | 7/2003 | Van Berge et al. |
| 2003/0165424 A1 | 9/2003 | Ramani et al. |
| 2005/0227866 A1 | 10/2005 | Berge et al. |

FOREIGN PATENT DOCUMENTS

| EP | 1 058 580 B1 | 2/2004 |
| EP | 1 444 040 B1 | 6/2005 |
| WO | 0139882 A1 | 6/2001 |
| WO | 2006123179 | 11/2006 |

OTHER PUBLICATIONS

European Patent Office PCT International Search Report, International Application PCT/IB2008/051724, mailed Jan. 22, 2009.
European Patent Office PCT Written Opinion of the ISA, International Application PCT/IB2008/051724, mailed Jan. 22, 2009.
European Patent Office PCT International Preliminary Report on Patentability, International Application PCT/IB2008/051724, completed Jul. 27, 2009.

*Primary Examiner* — Cam N. Nguyen
(74) *Attorney, Agent, or Firm* — Fellers, Snider, Blankenship, Bailey & Tippens, P.C.

(57) ABSTRACT

A process for producing a supported cobalt-based Fischer-Tropsch synthesis catalyst includes, in a first activation stage, treating a particulate catalyst precursor with a reducing gas, at a heating rate, HR1, until the precursor has reached a temperature, $T_1$, where 80° C.$\leq T_1 \leq$180° C., to obtain a partially treated precursor. In a second activation stage, the partially treated precursor is treated with a reducing gas, at an average heating rate, HR2, with x step increments, where 0<HR2<HR1, for a time, $t_1$, where $t_1$ is from 0.1 to 20 hours, to obtain a partially reduced precursor. Thereafter, in a third activation stage, the partially reduced precursor is treated with a reducing gas, at a heating rate, HR3, where HR3>HR2 until the partially reduced precursor reaches a temperature, $T_2$. The partially reduced precursor is maintained at $T_2$ for a time, $t_2$, where $t_2$ is from 0 to 20 hours, to obtain an activated catalyst.

12 Claims, No Drawings

CATALYSTS

THIS INVENTION relates to catalysts. In particular, the invention relates to a process for activating a catalyst precursor, to obtain a supported cobalt-based Fischer-Tropsch synthesis catalyst, and to a catalyst obtained from the process.

As regards supported cobalt-based Fischer-Tropsch synthesis catalysts, it is well-known that precursors of such catalysts are prepared using a metal precursor and a particulate support. The catalyst precursor preparation involves a number of different catalyst preparation steps. The catalyst precursor is then, in an activation process or step, reduced by using a reducing gas such as hydrogen, to obtain an active Fischer-Tropsch synthesis catalyst.

In known activation processes, ie involving reduction of the catalyst precursor in a flowing hydrogen or hydrogen containing gas stream at elevated temperatures, for supported cobalt-based Fischer-Tropsch synthesis catalyst precursors that the Applicant is aware of, hydrogen reduction is carried out at a temperature in the range 250° C. to 500° C., and preferably at low pressures and high linear gas velocities to minimize vapour pressure of any product water which enhances sintering of the reduced metal. It is well known that manipulation of the reduction of cobalt oxide to cobalt metal in different ways influences activity and selectivity of the resultant Fischer-Tropsch synthesis catalyst. In particular, U.S. Pat. No. 4,605,679 discloses that the activity of a cobalt catalyst can be increased by reduction in hydrogen, then re-oxidising the catalyst followed by re-reduction in hydrogen. In U.S. Pat. No. 5,292,705, it is shown that hydrogen reduction in the presence of hydrocarbon liquids enhances the initial Fischer-Tropsch synthesis performance of the catalyst. U.S. Pat. No. 5,585,316 claims that the selectivity of heavier Fischer-Tropsch products is increased if the catalyst is first oxidised and then reduced with carbon monoxide. EP 1444040 discloses a two stage reduction step with pure hydrogen with a catalyst precursor in which all reducible cobalt oxide species combined can be described by the formula-unit $CoO_aH_b$ (where: $a \geq 1.7$ and $b > 0$), resulting in a more economical reduction process without sacrificing Fischer-Tropsch synthesis catalyst activity.

An object of the present invention is to provide a supported cobalt-based Fischer-Tropsch synthesis catalyst having a higher hydrocarbon synthesis activity. Such a catalyst can be obtained with the process of the present invention.

According to the invention, there is provided a process for producing a supported cobalt-based Fischer-Tropsch synthesis catalyst, which process includes in a first activation stage, treating a particulate supported cobalt-based Fischer-Tropsch synthesis catalyst precursor comprising a catalyst support impregnated with cobalt and containing cobalt oxide, with a hydrogen-containing reducing gas or a nitrogen-containing gas, at a first heating rate, HR1, until the precursor has reached a temperature, $T_1$, where 80° C. $\leq T_1 \leq$ 180° C., to obtain a partially treated catalyst precursor;

in a second activation stage, treating the partially treated catalyst precursor with a hydrogen-containing reducing gas, at a second average heating rate, HR2, with x step increments, where x is an integer and is greater than 1, and where 0<HR2<HR1, for a time, $t_1$, where $t_1$ is from 0.1 to 20 hours, to obtain a partially reduced catalyst precursor; and thereafter in a third activation stage, treating the partially reduced catalyst precursor with a hydrogen-containing reducing gas, at a third heating rate, HR3, where HR3>HR2 until the partially reduced catalyst precursor reaches a temperature, $T_2$, and maintaining the partially reduced catalyst precursor at $T_2$ for a time, $t_2$, where $t_2$ is from 0 to 20 hours, to obtain an activated supported cobalt-based Fischer-Tropsch synthesis catalyst.

Within the context of this invention, the average heating rate HR2 is defined as the sum of the heating rates for each step increment divided by the number of step increments, where a step increment is defined as an increase in the heating rate, x is the number of step increments, and x>1.

It was surprisingly found that a supported cobalt-based Fischer-Tropsch synthesis catalyst having high intrinsic activity was obtained when the catalyst precursor was subjected to the reduction or activation procedure of the invention.

The treatments in the first, second and third activation stages may, at least in principle, be effected by using any suitable contacting configuration of the catalyst precursor with the reducing gas, such as a fluidized bed of the catalyst precursor particles, with the reducing gas acting as the fluidizing medium; a fixed bed of the catalyst precursor particles through which the reducing gas passes; or the like. However, a fluidized bed configuration is preferred.

The first activation stage commences when the catalyst precursor is first subjected to treatment with the hydrogen-containing reducing gas or the nitrogen-containing gas with the immediate application of the first heating rate HR1. The gas in the first activation stage will have a gas space velocity, SV1. Preferably, $1 \leq SV1 \leq 35$ m$^3_n$/kg red. Co/h; more preferably, $3 \leq SV1 \leq 15$ m$^3_n$/kg red. Co/h. By 'red.Co' or 'reducible cobalt' is meant the cobalt that can be reduced during normal reduction, eg if the catalyst or catalyst precursor contains 20 mass % cobalt and 50% of the cobalt can be reduced, then the amount of reducible cobalt is 0.1 g/g catalyst or catalyst precursor. The first activation stage continues until the precursor attains the temperature $T_1$.

Preferably, 0.5° C./min$\leq$HR1$\leq$10° C./min; more preferably, 1° C./min$\leq$HR1$\leq$2° C./min.

In the first activation stage, $T_1$ may be $\geq$90° C. In one embodiment of the invention, 120° C.$\leq T_1 \leq$150° C. This embodiment will typically apply to precursors obtained by forming a slurry of a particulate catalyst support, a cobalt compound as an active component precursor, and water; subjecting the catalyst support to impregnation with the cobalt compound; drying the impregnated catalyst support; and calcining the impregnated support.

The second activation stage thus commences when the precursor has attained the temperature $T_1$, and endures for the time $t_1$ as hereinbefore described. As regards the second activation stage treatment time $t_1$, more preferably $1 \leq t_1 \leq 10$ hours, typically $2 \leq t_1 \leq 6$ hours.

In the second activation stage, at least two heating ramps are employed. Thus, at least two heating ramps in which the precursor is heated from the temperature $T_1$ to a temperature $T_H$ where $T_H > T_1$ and $T_H < 200$° C., are employed over treatment time $t_1$. Thus, when two heating ramps are employed, x=2; when three heating ramps are employed, x=3; etc. The heating rates in the heating ramps will thus differ. For example, if the heating rate in a first heating ramp is 1° C./min, then the heating rate in a second heating ramp can be 2° C./min. Still further, the precursor can, if desired, be held for some time at the temperature attained at the end of a heating ramp, before commencing the next heating ramp.

The third activation stage commences once the time $t_1$ has elapsed. The precursor thus, at the commencement of the third activation stage, will be at the temperature $T_H$. The third activation stage treatment is thus continued until the temperature in the third treatment stage, ie the temperature of the activated Fischer-Tropsch catalyst, reaches $T_2$. Preferably, 300° C.$\leq T_2 \leq$600° C. More preferably, $T_2$ may be in the range of 300° C. to 500° C., with a typical value of $T_2$ being in the range of 300° C. to 450° C. The catalyst can be maintained at $T_2$ for 0-20 hours (ie $t_2$), preferably $0 < t_2 \leq 20$ hours, more preferably $1 \leq t_2 \leq 10$ hours, typically $2 \leq t_2 \leq 6$ hours.

The gas will also, in the second activation stage, have a space velocity, hereinafter referred to as SV2, and will also, in the third activation stage, have a space velocity, hereinafter referred to as SV3.

In one embodiment of the invention, SV1, SV2 and/or SV3 may be constant during the treatments in their respective activation stages. For example, the relationship of the space velocities in the various stages may be SV1=SV2=SV3. However, in another embodiment of the invention, SV1, SV2 and SV3 may vary during the respective activation stages.

In the first activation stage, a hydrogen-containing reducing gas is preferably used, and the gas used in the three activation stages may have the same composition. By 'hydrogen-containing reducing gas' is meant a hydrogen containing gas mixture comprising 10 vol %<$H_2 \leq$100 vol %, more preferably >90 vol % $H_2$ and <10 vol % inerts, most preferably >97 vol % $H_2$ and <3 vol % inerts. The inerts could be any combination of Ar, He, $NH_3$ and $H_2O$, with the preferred dew point of the hydrogen-containing reducing gas being $\leq$4° C., more preferably $\leq$-30° C.

In the first activation stage, a nitrogen-containing gas can instead be used. By 'nitrogen-containing gas' is meant a gas mixture comprising >90 vol % $N_2$ and <10 vol % other components with the other components being any combination of Ar, He, and $H_2O$. The preferred dew point of the nitrogen-containing gas is $\leq$4° C., more preferably $\leq$-30° C. This nitrogen containing gas does not contain any hydrogen (ie hydrogen=0 vol %).

The treatments in the first, second and third activation stages may be effected at the same or different pressures, and may each be effected at about atmospheric pressure, preferably at between 0.6 and 1.3 bar(a).

The particulate supported cobalt-based Fischer-Tropsch synthesis ('FTS') catalyst precursor may be any suitable catalyst precursor requiring activation or reduction to obtain an active Fischer-Tropsch catalyst, and may be that obtained during preparation of a fresh catalyst or from a regenerated catalyst. Thus, it may be that obtained during preparation of a fresh catalyst, ie obtained by forming a slurry of a particulate catalyst support, a cobalt compound as an active component precursor, and water; subjecting the catalyst support to impregnation with the cobalt compound; drying the impregnated catalyst support; and calcining the impregnated support, to obtain the catalyst precursor, which contains cobalt oxide. The catalyst precursor thus obtained must, however, then still be activated or reduced prior to using it for catalyzing a Fischer-Tropsch reaction, and this reduction or activation is effected in accordance with the method of the present invention. The resultant catalyst is thus an activated Fischer-Tropsch catalyst.

The regenerated catalyst precursor can be that obtained by regenerating a spent cobalt Fischer-Tropsch catalyst, that was used in a FTS process for a period of time, by means of any suitable regeneration process, which results in an oxidized catalyst precursor containing supported cobalt oxide.

Any commercially available pre-shaped porous oxide catalyst support, such as alumina ($Al_2O_3$), silica ($SiO_2$), titania ($TiO_2$), magnesia (MgO), $SiO_2$—$Al_2O_3$ and zinc oxide (ZnO), may be used. The support preferably has an average pore diameter between 8 and 50 nanometers, more preferably between 10 and 15 nanometers. The support pore volume may be between 0.1 and 1.5 ml/g, preferably between 0.3 and 0.9 ml/g.

The support may be a protected modified catalyst support, containing, for example, silicon as modifying component, as generally described in EP Application No. 99906328.2 (European Publication No. 1058580), which is hence incorporated herein by reference.

More specifically, the protected modified catalyst support may be that obtained by contacting a silicon precursor, eg an organic silicon compound such as tetra ethoxy silane ('TEOS') or tetra methoxy silane ('TMOS'), with the catalyst support, eg by means of impregnation, precipitation or chemical vapour deposition, to obtain a silicon-containing modified catalyst support; and calcining the silicon-containing modified catalyst support, eg in a rotary calciner, at a temperature from 100° C. to 800° C., preferably from 450° C. to 550° C., and for a period of from 1 minute to 12 hours, preferably from 0.5 hour to 4 hours.

The cobalt loading can be between 5 gCo/100 g support and 70 gCo/100 g support, preferably between 20 gCo/100 g support and 55 gCo/100 g support.

The cobalt salt may, in particular, be cobalt nitrate, $Co(NO_3)_2 \cdot 6H_2O$.

The impregnation of the catalyst support may, in principle, be effected by any known method or procedure such as incipient wetness impregnation or slurry impregnation. Thus, the impregnation may generally be effected in the manner described in U.S. Pat. No. 6,455,462 or in U.S. Pat. No. 5,733,839, and which are thus incorporated herein by reference thereto.

More specifically, impregnation may be effected by subjecting, at elevated temperature, a slurry comprising the particulate catalyst support, water, and the cobalt salt to a sub-atmospheric pressure environment, which may be down to 5 kPa(a), preferably between atmospheric pressure and 10 kPa (a); drying the impregnated carrier at elevated temperature and under a sub-atmospheric pressure environment, which may be as hereinbefore described. Still more specifically, the impregnation may be effected by subjecting the slurry, in an initial treatment stage, to treatment at elevated temperature and under a sub-atmospheric pressure environment as hereinbefore described to impregnate the support with the cobalt salt and to dry the impregnated support partially, and thereafter, in a subsequent treatment stage, subjecting the partially dried impregnated support to treatment of elevated temperature and under a sub-atmospheric pressure environment as hereinbefore described, such that the temperature in the subsequent treatment stage exceeds that in the initial treatment stage and/or the sub-atmospheric pressure in the subsequent treatment stage is lower than that in the initial treatment stage, thereby to obtain more vigorous drying of the impregnated support in the subsequent treatment stage than in the initial treatment stage, to obtain a dried impregnated support.

The impregnation may include subjecting the support to two or more impregnation steps, to obtain a desired cobalt loading. Each impregnation step may then include an initial and a subsequent treatment stage as hereinbefore described.

The process may then include, in each of the impregnation steps, controlling the drying rate of the slurry to a specified drying profile.

The support impregnation may thus involve a 2-step slurry phase impregnation process, which is dependent on a desired cobalt loading requirement and the pore volume of the catalyst support.

The support impregnation and drying may typically be effected in a conical vacuum drier with a rotating screw or in a tumbling vacuum drier.

During the cobalt impregnation steps, a water soluble precursor salt of platinum (Pt), palladium (Pd), ruthenium (Ru), rhenium (Re) or mixtures thereof, may be added, as a dopant capable of enhancing the reducibility of the active component.

Calcination of the impregnated and dried material may be done using any method, known to those skilled in the art, for example in a fluidized bed, or a rotary kiln, calciner at 200-400° C. It may, in particular, be effected as described in PCT Patent Application WO 01/39882, which is thus also incorporated herein by reference.

The invention extends also to an activated Fischer-Tropsch catalyst, when obtained by the process of the first aspect of the invention.

The activated Fischer-Tropsch catalyst can be used in a process for producing hydrocarbons, which includes contacting a synthesis gas comprising hydrogen ($H_2$) and carbon monoxide (CO) at an elevated temperature between 180° C. and 250° C. and an elevated pressure between 10 and 40 bar with an activated Fischer-Tropsch catalyst as hereinbefore described, using a Fischer-Tropsch reaction of the hydrogen with the carbon monoxide.

The invention will now be described in more detail with reference to the following non-limiting example.

EXAMPLE 1

A particulate supported cobalt-based Fischer-Tropsch synthesis catalyst precursor, which, on activation, produces a 30 g Co/0.075Pt/1.5Si/100 g $Al_2O_3$ proprietary slurry phase Fischer-Tropsch synthesis catalyst of the Applicant, and which is fully described in WO 01/39882, was investigated.

A representative batch of this pre-reduced catalyst precursor was specifically prepared as follows: Puralox SCCa 2/150, pore volume of 0.48 ml/g, from SASOL Germany GmbH of Uberseering 40, 22297 Hamburg, Germany was modified with silicon such that the final silicon level was 2.5 Si atoms/$nm^2$ of support. TEOS (tetra ethoxy silane) was added to ethanol, alumina (11 ethanol/kg alumina) was added to this solution, and the resultant mixture stirred at 60° C. for 30 minutes. Subsequently the solvent was removed under vacuum with a jacket temperature of the drier equipment of 95° C. The dried modified support was then calcined at 500° C. for 2 hours. A solution of 17.4 kg of $Co(NO_3)_2.6H_2O$, 9.6 g of $(NH_3)_4Pt(NO_3)_2$, and 11 kg of distilled water was mixed with 20.0 kg of the above mentioned silica modified gamma alumina support by adding the support to the solution. The slurry was added to a conical vacuum drier and continuously mixed. The temperature of this slurry was increased to 60° C. after which a pressure of 20 kPa(a) was applied. During the first 3 hours of the drying step, the temperature was increased slowly and reached 95° C. after 3 hours. After 3 hours the pressure was decreased to 3-15 kPa(a), and a drying rate of 2.5 m %/h at the point of incipient wetness was used. The complete impregnation and drying step took 9 hours, after which the impregnated and dried catalyst support was immediately and directly loaded into a fluidised bed calciner. The temperature of the dried impregnated catalyst support was about 75° C. at the time of loading into the calciner. The loading took about 1 to 2 minutes, and the temperature inside the calciner remained at its set point of about 75° C. The dried impregnated catalyst support was heated from 75° C. to 250° C., using a heating rate of 0.5° C./min and an air space velocity of 1.0 $m^3_n$/kg $Co(NO_3)_2.6H_2O$/h, and kept at 250° C. for 6 hours. To obtain a catalyst with a cobalt loading of 30 gCo/100 g$Al_2O_3$, a second impregnation/drying/calcination step was performed. A solution of 9.4 kg of $Co(NO_3)_2.6H_2O$, 15.7 g of $(NH_3)_4Pt(NO_3)_2$, and 15.1 kg of distilled water was mixed with 20.0 kg of the catalyst precursor from the first impregnation and calcination, by adding the catalyst precursor to the solution. The slurry was added to a conical vacuum drier and continuously mixed. The temperature of this slurry was increased to 60° C. after which a pressure of 20 kPa(a) was applied. During the first 3 hours of the drying step, the temperature was increased slowly and reached 95° C. after 3 hours. After 3 hours the pressure was decreased to 3-15 kPa(a), and a drying rate of 2.5 m %/h at the point of incipient wetness was used. The complete impregnation and drying step took 9 hours, after which the treated catalyst support was immediately and directly loaded into the fluidised bed calciner. The temperature of the dried impregnated catalyst support was about 75° C. at the time of loading into the calciner. The loading took about 1 to 2 minutes, and the temperature inside the calciner remained at its set point of about 75° C. The dried impregnated catalyst was heated from 75° C. to 250° C., using a heating rate of 0.5° C./min and an air space velocity of 1.0 $m^3_n$/kg $Co(NO_3)_2.6H_2O$/h, and kept at 250° C. for 6 hours. A supported cobalt catalyst precursor on an alumina support was thus obtained.

One sample of this precursor, identified as Precursor A, was subjected to a standard one-step reduction or activation procedure as follows:

In a fluidized bed (20 mm internal diameter) reduction unit, the catalyst precursor A was reduced, at atmospheric pressure, utilizing an undiluted $H_2$ reducing gas (100 vol % $H_2$) as total feed gas at a space velocity of 13.7 $m^3_n$ per kilogram reducible cobalt per hour, whilst applying the following temperature program: heat from 25° C. to 425° C. at 1° C./min, and hold isothermally at 425° C. for 16 hours.

Precursor A was thus thereby transformed into comparative Catalyst A.

Another sample of this precursor, identified as Precursor B, was subjected to the following 3 stage reduction procedure (Table 1):

(i) in a first activation stage, the sample was heated from 25° C. to 120° C. at a first heating rate of 1° C./min using pure 100% hydrogen;

(ii) in a second activation stage, sample B was held at 120° C. for 3 hours, then at 130° C. for a further 3 hours, and thereafter at 140° C. for yet a further 3 hours;

(iii) in a third activation stage, the sample was heated from 140° C. to 425° C. at a heating rate of 1° C./min and using the same space velocity as in the first and second activation stages; the temperature was held at 425° C. for 4 hours.

This reduction procedure was also carried out in the fluidized bed reduction unit hereinbefore described, and the same undiluted $H_2$ reducing gas (100 vol % $H_2$) was used in all three activation stages. During all three stages a space velocity of 13.7 $m_n^3$/kg reducible cobalt/hour was used, while using the pure 100% hydrogen.

Thus, Precursor B was subjected to a 3-stage reduction/activation procedure in accordance with the invention, to obtain Catalyst B which is thus in accordance with the invention.

During reduction, precursors A and B were thus transformed into Fischer-Tropsch synthesis ('FTS') Catalysts A and B respectively. These catalysts were evaluated in a laboratory scale reactor under realistic FTS conditions (230° C., 17.5 $bar_g$ pressure, $H_2$:CO inlet ratio of 1.9:1, inlet contains 15% inerts (hence 85% of inlet is $H_2$ and CO), synthesis gas space velocity of 7000 ml/g/h and at synthesis gas conversions of between 50 and 65%).

TABLE 1

Summary of the FTS runs of Example 1

| Catalysts | Stage 2 conditions | Run | RIAF after 15 hours on line relative to sample A |
|---|---|---|---|
| A | — | 198£ | 1.00 |
| B | 3 hour steps at 120° C., 130° C. and 140° C. | CB034 | 1.10 |

RIAF = Relative Intrinsic Fischer-Tropsch Tropsch synthesis Activity Factor

From Table 1(RIAF data) it is clear that the activity of the 3-stage reduced catalyst B (run CB034) is significantly higher than that of the standard reduced catalyst A (run 198£) after 1 day online.

The Relative Intrinsic Fischer-Tropsch synthesis Activity Factor ('RIAF$_x$') of a supported cobalt slurry phase catalyst, of which the pre-reduction catalyst precursor has been prepared in strict accordance with a prescribed catalyst preparation procedure X, ie catalyst precursor X, is defined as:

$$RIAF_x = [A_{xi}/A_x] \quad (1)$$

where:
a) $A_{xi}$ is the Arrhenius pre-exponential factor of catalyst precursor X, activated according to an arbitrary reduction procedure
b) $A_x$ is the Arrhenius pre-exponential factor of catalyst precursor X, estimated from the 15 hours on stream slurry-phase Continuous Stirred Tank Reactor (CSTR) Fischer-Tropsch synthesis performance under realistic conditions, and having utilized the standard one-step reduction procedure:
Fluidized bed (20 mm internal diameter) reduction of 15±5 g catalyst precursor A (ie pre-reduction catalyst mass), at atmospheric pressure utilizing an undiluted $H_2$ reducing gas (purity of 5.0) as total feed at a space velocity of 13700 ml$_n$ per gram reducible cobalt per hour, whilst applying the following temperature program: heat from 25° C. to 425° C. at 1° C./min, and hold isothermally at 425° C. for 16 hours.
c) The pre-exponential factor A, ie applicable to both $A_{xi}$ and $A_x$, is defined from the generally accepted cobalt-based Fischer-Tropsch empirical kinetic expression:

$$r_{FT} = [AE^{(-Ea/RT)}P_{H2}P_{CO}]/[1+KP_{CO}]^2 \quad (2)$$

Thus:

$$A = [r_{FT}(1+KP_{CO})^2]/[e^{(-Ea/RT)}P_{H2}P_{CO}] \quad (3)$$

where:
$r_{FT}$ is expressed in terms of the number of moles of CO converted into Fischer-Tropsch synthesis products per unit time per unit mass of the catalyst precursor in its pre-reduction state.
d) x is any catalyst precursor.

The invention claimed is:

1. A process for producing a supported cobalt-based Fischer-Tropsch synthesis catalyst, which process includes
in a first activation stage, treating a particulate supported cobalt-based Fischer-Tropsch synthesis catalyst precursor comprising a catalyst support impregnated with cobalt and containing cobalt oxide, with a hydrogen-containing reducing gas or a nitrogen-containing gas, at a first heating rate, HR1, until the precursor has reached a temperature, $T_1$, where 80° C.$\leq T_1 \leq$180° C., to obtain a partially treated catalyst precursor;
in a second activation stage, treating the partially treated catalyst precursor with a hydrogen-containing reducing gas, at a second average heating rate, HR2, with x step increments, where x is an integer and is greater than 1, and where 0<HR2<HR1, for a time, $t_1$, where $t_1$ is from 0.1 to 20 hours, to obtain a partially reduced catalyst precursor; and thereafter
in a third activation stage, treating the partially reduced catalyst precursor with a hydrogen-containing reducing gas, at a third heating rate, HR3, where HR3>HR2 until the partially reduced catalyst precursor reaches a temperature, $T_2$, and maintaining the partially reduced catalyst precursor at $T_2$ for a time, $t_2$, where $t_2$ is from 0 to 20 hours, to obtain an activated supported cobalt-based Fischer-Tropsch synthesis catalyst.

2. A process according to claim 1 wherein, in the first activation stage, 0.5° C./min$\leq$HR1$\leq$10° C./min.

3. A process according to claim 2 wherein, in the first activation stage, 1° C./min$\leq$HR1$\leq$2° C./min.

4. A process according to claim 1 wherein, in the second activation stage, 1$\leq t_1 \leq$10 hours.

5. A process according to claim 4 wherein, in the second activation stage, 2$\leq t_1 \leq$6 hours.

6. A process according to claim 1 wherein, in the second activation stage, the precursor is heated from the temperature $T_1$ to a temperature $T_H$ where $T_H$>$T_1$ and $T_H$<200° C.

7. A process according to claim 1 wherein, in the third activation stage, 300° C.$\leq T_2 \leq$600° C.

8. A process according to any claim 1 wherein, in the third activation stage, 1$\leq t_2 \leq$10 hours.

9. A process according to claim 1, wherein the space velocity of the gas is constant during the treatments in the first, second and third stages.

10. A process according to claim 1, wherein the treatments in the first, second and third activation stages are each effected at a pressure between 0.6 and 1.3 bar(a).

11. A process according to claim 1, wherein a hydrogen-containing reducing gas is used in the first activation stage, with the hydrogen-containing reducing gas in each of the activation stages comprising >90 vol % $H_2$ and <10 vol % inerts.

12. A process according to claim 1, wherein the hydrogen-containing reducing gas in each of the activation stages comprise >97 vol % $H_2$ and <3 vol % inerts.

* * * * *

UNITED STATES PATENT AND TRADEMARK OFFICE
CERTIFICATE OF CORRECTION

PATENT NO. : 8,067,333 B2  
APPLICATION NO. : 12/598742  
DATED : November 29, 2011  
INVENTOR(S) : Visagie et al.

Page 1 of 1

It is certified that error appears in the above-identified patent and that said Letters Patent is hereby corrected as shown below:

Claim 8, Col. 8, Line 40 – The word "any" is deleted from claim 1.

Claim 12, Col. 8, Lines 54-55, The word "comprise" is corrected to <u>comprises</u>.

Signed and Sealed this
Twenty-fourth Day of January, 2012

David J. Kappos
*Director of the United States Patent and Trademark Office*